(12) United States Patent
Yoshida

(10) Patent No.: US 10,910,832 B2
(45) Date of Patent: Feb. 2, 2021

(54) CONVERTER APPARATUS HAVING FUNCTION OF DETECTING SHORT CIRCUIT FAILURE, AND METHOD FOR DETECTING SHORT CIRCUIT FAILURE OF CONVERTER APPARATUS

(71) Applicant: FANUC CORPORATION, Yamanashi (JP)

(72) Inventor: Tomokazu Yoshida, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/934,196

(22) Filed: Mar. 23, 2018

(65) Prior Publication Data

US 2018/0278052 A1 Sep. 27, 2018

(30) Foreign Application Priority Data

Mar. 27, 2017 (JP) .................. 2017-061216

(51) Int. Cl.
*H02H 11/00* (2006.01)
*H02H 7/125* (2006.01)
(Continued)

(52) U.S. Cl.
CPC ........ *H02H 11/005* (2013.01); *H02H 7/1213* (2013.01); *H02H 7/1257* (2013.01);
(Continued)

(58) Field of Classification Search
CPC .. H01H 11/005; H01H 7/1213; H01H 7/1257; H02P 29/032; H02P 29/025; H02P 29/0241; H02P 27/06
See application file for complete search history.

(56) References Cited

U.S. PATENT DOCUMENTS 8,736,215 B2  5/2014  Niwa et al.
9,391,503 B2  7/2016  Park et al.
(Continued)

FOREIGN PATENT DOCUMENTS

CN  103368497 A  10/2013
CN  104518679 A  4/2015
(Continued)

*Primary Examiner* — Son T Le
*Assistant Examiner* — Adam S Clarke
(74) *Attorney, Agent, or Firm* — RatnerPrestia

(57) ABSTRACT

A converter apparatus includes: an AC/DC converter; a DC link capacitor connected to the converter; a voltage detection unit detecting the DC link voltage; a switching unit connecting or disconnecting between a power supply and the converter; a switching operation unit detecting an abnormality in a motor drive device including the converter apparatus and an inverter, and control the switching unit; a power supply monitoring unit detecting a voltage inputted to the converter to monitor a connection state between the power supply and the converter; a threshold value setting unit setting a threshold value to determine the presence or absence of a short circuit failure; and a short circuit failure detection unit determining that a short circuit failure has occurred, when the voltage of the DC link capacitor, immediately after the power supply is disconnected from the converter, is equal to or less than the threshold value.

10 Claims, 3 Drawing Sheets

(51) Int. Cl.
*H02P 29/024* (2016.01)
*H02P 29/032* (2016.01)
*H02H 7/12* (2006.01)
*H02P 27/06* (2006.01)

(52) U.S. Cl.
CPC ........ *H02P 29/025* (2013.01); *H02P 29/0241* (2016.02); *H02P 29/032* (2016.02); *H02P 27/06* (2013.01)

(56) References Cited

U.S. PATENT DOCUMENTS

| | | | |
|---|---|---|---|
| 9,535,107 B2 | 1/2017 | Yang | |
| 9,716,461 B2 | 7/2017 | Tateda et al. | |
| 9,859,821 B2 | 1/2018 | Yamamoto | |
| 10,541,539 B1* | 1/2020 | Miyake | H02M 1/08 |
| 2010/0123978 A1* | 5/2010 | Lin | H02M 3/156 361/18 |
| 2015/0048767 A1* | 2/2015 | Takezawa | H02M 7/217 318/400.3 |
| 2015/0365019 A1* | 12/2015 | Yamamoto | H02P 1/022 318/490 |
| 2016/0380571 A1* | 12/2016 | Yoshida | H02H 7/1216 318/504 |

FOREIGN PATENT DOCUMENTS

| | | |
|---|---|---|
| CN | 105450145 A | 3/2016 |
| JP | 08009647 A | 1/1996 |
| JP | H08098419 A | 4/1996 |
| JP | 2014011952 A | 1/2014 |
| JP | 2014-217085 A | 11/2014 |
| JP | 2016116432 A | 6/2016 |
| JP | 2016220497 A | 12/2016 |
| JP | 2017034858 A | 2/2017 |

* cited by examiner

CONVERTER APPARATUS HAVING FUNCTION OF DETECTING SHORT CIRCUIT FAILURE, AND METHOD FOR DETECTING SHORT CIRCUIT FAILURE OF CONVERTER APPARATUS

This application is a new U.S. patent application that claims benefit of JP 2017-061216 filed on Mar. 27, 2017, the content of 2017-061216 is incorporated herein by reference.

BACKGROUND OF THE INVENTION

1. Field of the Invention

The present invention relates to a converter apparatus having the function of detecting a short circuit failure, and a method for detecting a short circuit failure of the converter apparatus.

2. Description of Related Art

As a method for driving a motor by a motor drive device, a method in which an AC voltage inputted from a main power supply is converted into a DC voltage by a converter, and the DC voltage is converted into an AC voltage to drive the motor by an inverter is generally known. A DC link capacitor is generally provided in order to smooth the DC voltage outputted from the converter. When there is an abnormality in a main circuit or the DC link capacitor, supplying AC power from the main power supply may damage the motor drive device. For example, if the main power is supplied in a state where the DC link capacitor is shorted out, a large current flowing through the converter may damage the motor drive device. Thus, before supplying the AC power from the main power supply to the converter, it is important to check the presence or absence of a short circuit in the DC link capacitor.

A motor drive device having the function of detecting an abnormality of a DC link unit is reported so far (for example, Japanese Unexamined Patent Publication (Kokai) No. 2014-217085). The conventional motor drive device includes a converter unit configured to convert an AC voltage inputted from a main power supply into a DC voltage; a DC link unit configured to rectify the DC voltage outputted from the converter unit; an inverter unit configured to convert the DC voltage rectified by the DC link unit into an AC voltage to drive a motor by semiconductor switching elements; a voltage applying unit provided separately from the main power supply, for applying a voltage to the DC link unit; a voltage detection unit configured to detect the voltage of the DC link unit, after the voltage is applied by the voltage applying unit; and an abnormality detection unit configured to determine the presence or absence of an abnormality of the DC link unit, based on a measurement value of the voltage detected by the voltage detection unit for a specific time and a voltage change rate with time.

SUMMARY OF THE INVENTION

However, a conventional motor drive device needs to have a voltage applying unit that is separate from a power supply, and therefore has difficulty in detecting the presence or absence of an abnormality of a main circuit of a converter apparatus, with a simple configuration.

A converter apparatus according to an embodiment of this disclosure includes a converter configured to convert an AC voltage supplied from a power supply into a DC voltage, and output the DC voltage; a DC link capacitor connected to an output side of the converter; a voltage detection unit configured to detect the voltage of the DC link capacitor; a switching unit configured to connect or disconnect between the power supply and the converter; a switching operation unit configured to monitor an abnormality in a motor drive device including the converter apparatus and an inverter connected to the converter apparatus, and issue a command to the switching unit; a power supply monitoring unit configured to detect a voltage inputted to the converter to monitor a connection state between the power supply and the converter; a threshold value setting unit configured to set a threshold value to determine the presence or absence of a short circuit failure; and a short circuit failure detection unit configured to determine that a short circuit failure has occurred, when the voltage of the DC link capacitor, immediately after the switching unit disconnects the power supply from the converter, is equal to or less than the threshold value.

In a method for detecting a short circuit failure of a converter apparatus, the converter apparatus includes a converter configured to convert an AC voltage supplied from a power supply into a DC voltage, and output the DC voltage; a DC link capacitor connected to an output side of the converter; a voltage detection unit configured to detect the voltage of the DC link capacitor; a switching unit configured to control a supply of the AC voltage from the power supply to the converter; and a switching operation unit configured to monitor an abnormality of a motor drive device including the converter apparatus and an inverter connected to the converter apparatus, and issue a command to the switching unit. The method includes, when any abnormality occurs during operation of the motor drive device, turning the switching unit into an open state by the switching operation unit, to disconnect the power supply from the converter; detecting the voltage of the DC link capacitor, immediately after the power supply is disconnected from the converter; and determining that the occurred abnormality is caused by a short circuit failure of a main circuit, when the detected voltage of the DC link capacitor is equal to or less than a threshold value.

BRIEF DESCRIPTION OF THE DRAWINGS

The objects, features, and advantages of the present invention will be more apparent from the following description of a preferred embodiment relating to the accompanying drawings. In the drawings.

DETAILED DESCRIPTION OF THE INVENTION

A converter apparatus having the function of detecting a short circuit failure, and a method for detecting a short circuit failure of the converter apparatus according to the present invention will be described below with reference to the drawings. However, the technical scope of the present invention is not limited to its embodiment, but embraces the invention described in claims and equivalents thereof.

Figure 1:
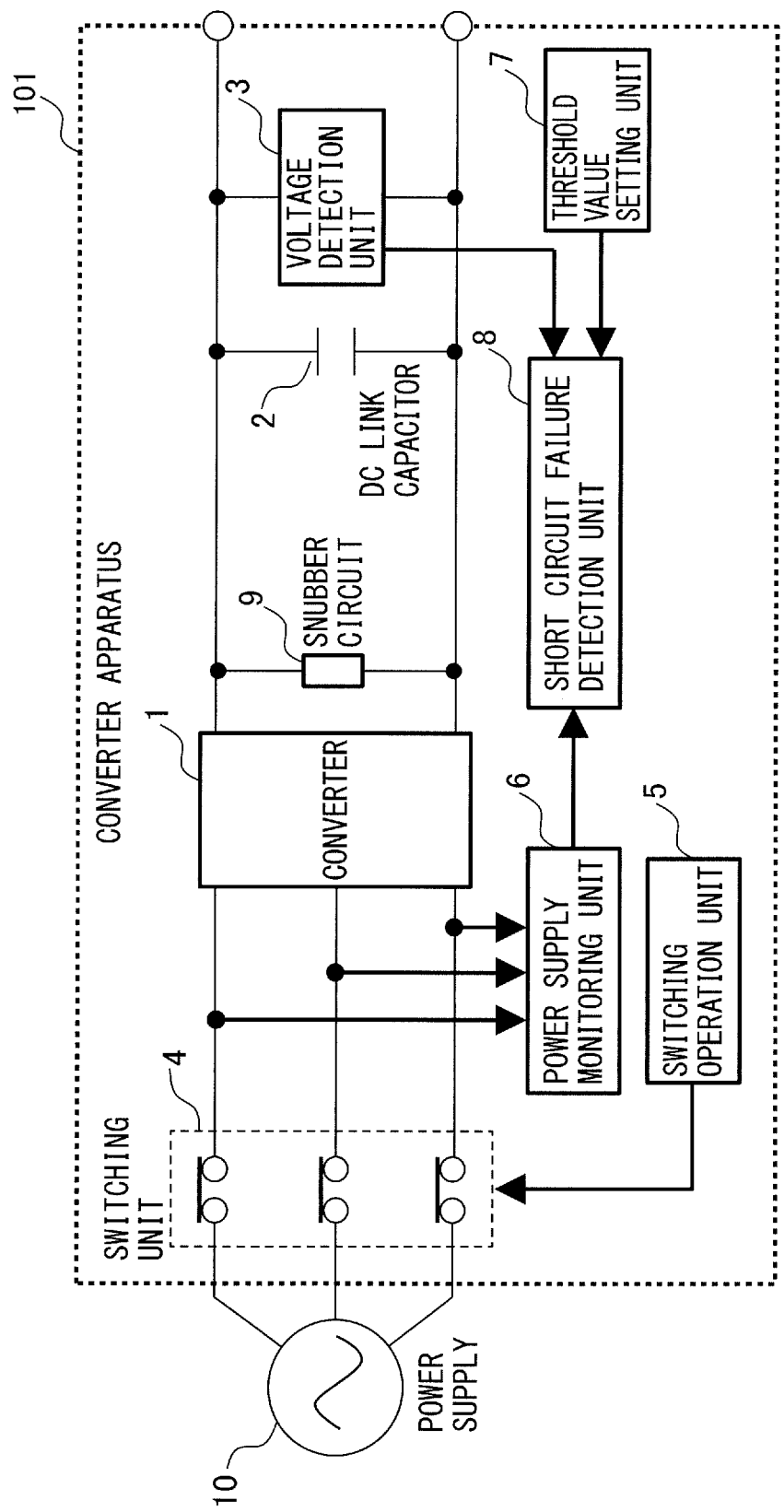
FIG. 1 is a block diagram of a converter apparatus according to an embodiment.

A converter apparatus having the function of detecting a short circuit failure according to an embodiment of this disclosure will be described. FIG. 1 is a block diagram of the converter apparatus according to the embodiment. A converter apparatus 101 according to the embodiment includes a converter 1, a DC link capacitor 2, a voltage detection unit 3, a switching unit 4, a switching operation unit 5, a power supply monitoring unit 6, a threshold value setting unit 7, and a short circuit failure detection unit 8.

The converter 1 converts an AC voltage supplied from a power supply 10 into a DC voltage, and outputs the DC voltage. The converter 1 may be a three-phase full-wave rectification circuit including, for example, six diodes.

The DC link capacitor 2 is connected to an output side of the converter 1. The DC link capacitor 2 smooths the DC voltage outputted from the converter 1.

The voltage detection unit 3 detects the voltage of the DC link capacitor 2. The voltage of the DC link capacitor 2 detected by the voltage detection unit 3 is outputted to the short circuit failure detection unit 8.

The switching unit 4 connects or disconnects between the power supply 10 and the converter 1. The switching unit 4 includes three switches each of which corresponds to each phase of the power supply 10, i.e. a three-phase AC power supply. Note that, FIG. 1 illustrates an example of using the three-phase AC power supply as the power supply 10. However, the power supply is not limited to the three-phase AC power supply, but may be a single-phase AC power supply.

The switching operation unit 5 perceives the state of a motor drive device that includes the converter apparatus and an inverter connected to the converter apparatus. When an abnormality occurs in the motor drive device, the switching operation unit 5 immediately sends a command to the switching unit 4 to turn the switching unit 4 into an open state.

The power supply monitoring unit 6 monitors the connection state between the power supply 10 and the converter 1 by detecting a voltage inputted to the converter 1. The short circuit failure detection unit 8 is notified of the state of the switching unit 4 monitored by the power supply monitoring unit 6. As the switching unit 4, an electromagnetic contactor, etc., can be used.

When the switching unit 4 is closed (turned into a closed state) upon a command from the switching operation unit 5, the power supply 10 is connected to the converter 1, and an AC voltage is applied to the converter 1. The converter 1 converts the AC voltage into a DC voltage, and the DC voltage is applied to the DC link capacitor 2. After the DC link capacitor 2 is charged, the motor drive device becomes an operable state.

On the other hand, when the switching unit 4 is opened (turned into an open state) upon a command from the switching operation unit 5, the converter 1 is disconnected from the power supply 10.

The threshold value setting unit 7 sets a threshold value $V_{TH}$ to determine the presence or absence of a short circuit failure. The threshold value $V_{TH}$ can be set at a voltage value between a DC link capacitor voltage detected when the DC link capacitor 2 operates normally and a DC link capacitor voltage detected when a main circuit of the converter apparatus has a short circuit failure. Thus, the threshold value $V_{TH}$ depends on the magnitude of the output voltage of the converter 1. The threshold value setting unit 7 can rewrite the threshold value $V_{TH}$ based on a signal inputted from outside. By rewriting the threshold value, a failure can be detected in accordance with use conditions.

When the voltage of the DC link capacitor 2, immediately after the switching unit 4 disconnects between the power supply 10 and the converter 1 upon a command from the switching operation unit 5, is equal to or less than the threshold value $V_{TH}$, the short circuit failure detection unit 8 determines that a short circuit failure occurs in the converter apparatus. When a short circuit failure is detected, the short circuit failure detection unit 8 may send a notification about the abnormality using a lamp, an alarm signal, etc. An operator is thereby notified of the occurrence of the abnormality, and protects the converter apparatus from being repowered, thus preventing secondary damage owing to a re-inrush of power.

A snubber circuit 9 may be provided on an output side of the converter 1. The provision of the snubber circuit 9 allows absorbing a transient high voltage occurring when disconnecting the switching unit 4.

Figure 2:
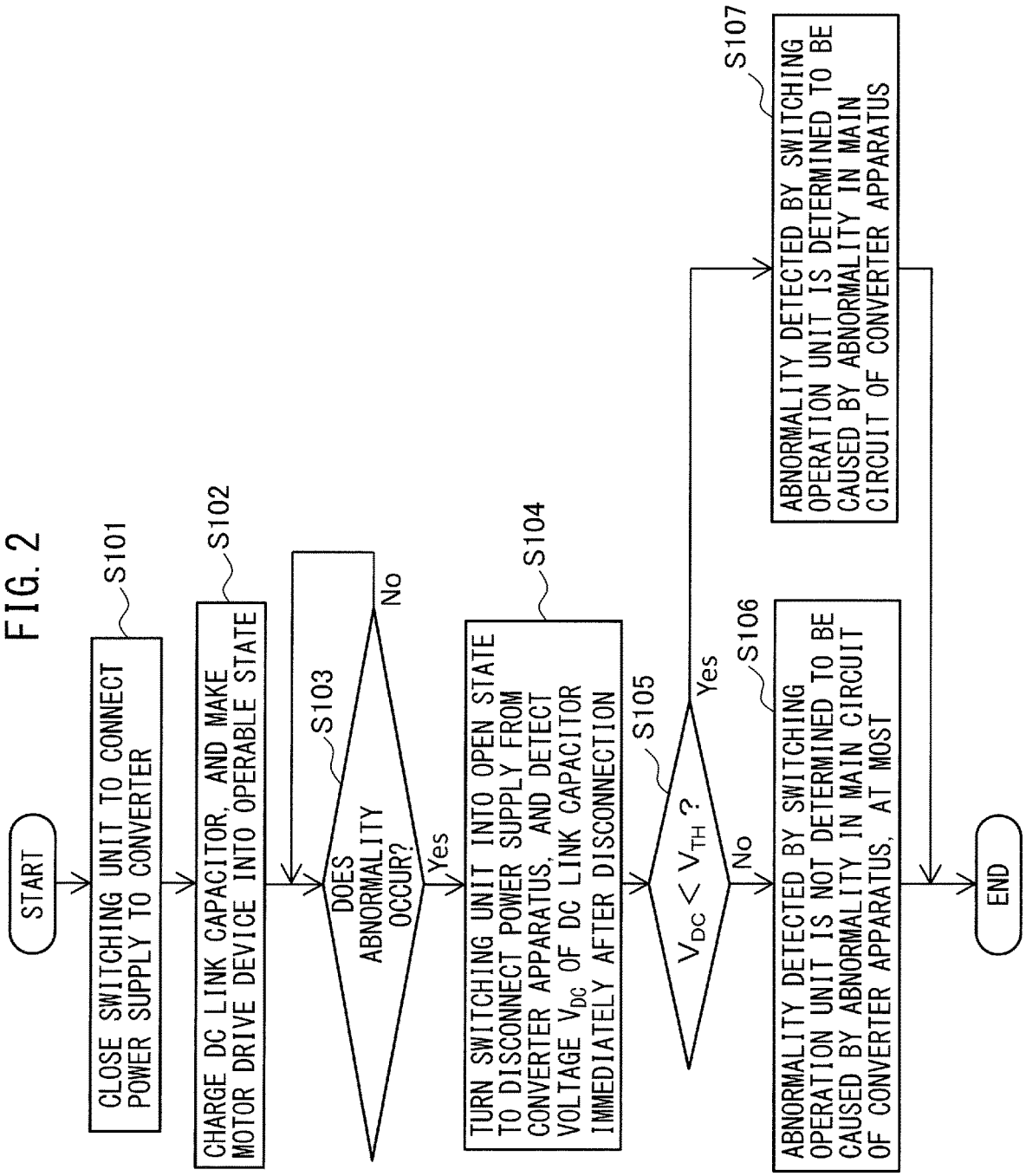
FIG. 2 is a flowchart that explains a short circuit failure detection process by a method for detecting a short circuit failure of the converter apparatus according to the embodiment.

Next, a method for detecting a short circuit failure using the converter apparatus according to this embodiment will be described. FIG. 2 is a flowchart that explains a short circuit failure detection process by the method for detecting a short circuit failure of the converter apparatus according to the embodiment. In step S101, the switching operation unit 5 commands the switching unit 4 to close, to connect between the converter 1 and the power supply 10. As a result, an AC voltage applied from the power supply 10 to the converter 1 is converted into a DC voltage, and the DC voltage is outputted to the DC link capacitor 2.

Next, in step S102, the DC link capacitor 2 is charged, and therefore the motor drive device becomes an operable state.

Next, in step S103, the switching operation unit 5 monitors whether or not an abnormality occurs in the motor drive device including the converter apparatus and the inverter connected to the converter apparatus. When the switching operation unit 5 detects an abnormality, the switching operation unit 5 issues a command to open the switching unit 4.

Next, in step S104, the switching unit 4 is turned into an open state upon the command from the switching operation unit 5, and the power supply 10 is disconnected from the converter 1. Upon the disconnection, the voltage detection unit 3 detects the voltage $V_{DC}$ of the DC link capacitor 2, immediately after the power supply 10 is disconnected from the converter 1. The power supply monitoring unit 6 notifies the short circuit failure detection unit 8 that the switching unit 4 has been turned into the open state. Immediately after receiving the notification, the short circuit failure detection unit 8 receives a detection result of the voltage $V_{DC}$ of the DC link capacitor 2 from the voltage detection unit 3.

Figure 3:
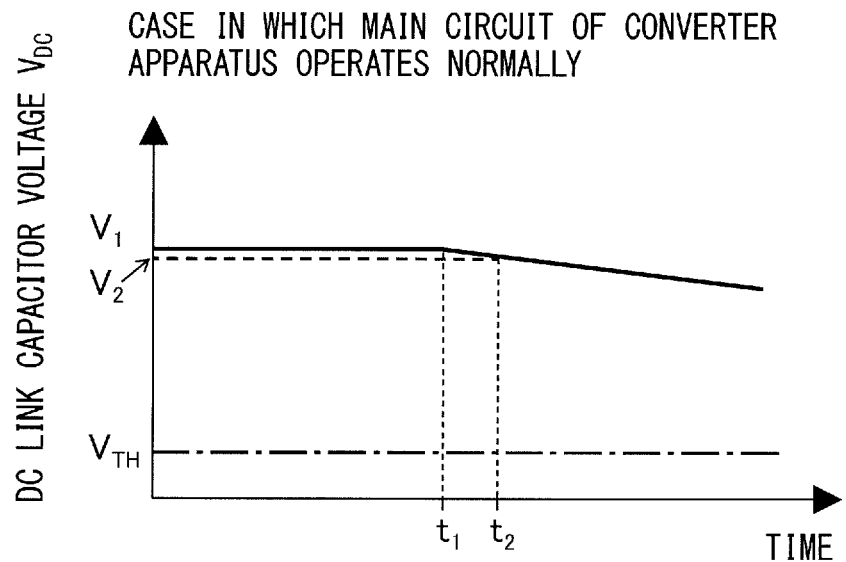
FIG. 3 is a graph showing a variation in the voltage of a DC link capacitor with time, when a main circuit of the converter apparatus operates normally.

Next, in step S105, the short circuit failure detection unit 8 determines whether or not the voltage $V_{DC}$ of the DC link capacitor 2 is less than a threshold value $V_{TH}$. FIG. 3 is a graph showing a variation in the voltage of the DC link capacitor with time, when the main circuit of the converter apparatus operates normally. It is assumed that, at a time $t_1$, the switching operation unit 5 detects any abnormality of the motor drive device, and controls the switching unit 4 so as to turn the switching unit 4 into an open state, in order to disconnect the power supply 10 from the converter 1. When the main circuit of the converter apparatus operates normally, the motor drive device operates normally and the voltage $V_{DC}$ of the DC link capacitor 2 is at $V_1$, until the time $t_1$. Since the power supply 10 is disconnected from the converter 1 at the time $t_1$, the DC link capacitor 2 starts being discharged, and the voltage $V_{DC}$ is gradually reduced. At a time $t_2$, which is immediately after the time $t_1$ of turning the switching unit 4 into the open state, electric charge is still accumulated in the DC link capacitor 2, and, in general, the voltage $V_{DC}$ of the DC link capacitor 2 hardly varies in units of several seconds. Assuming that the short circuit failure detection unit 8 receives the value of the voltage $V_{DS}$ from the voltage detection unit 3 at the time $t_2$, the voltage $V_2$ at this time is more than the threshold value $V_{TH}$, though slightly less than $V_1$. Therefore, the voltage $V_{DC}$ of the DC link capacitor 2 is determined to be equal to or more than the threshold value $V_{TH}$. In step S106, the short circuit failure detection unit 8 determines that the occurred abnormality is not caused by a short circuit failure in the main circuit of the converter apparatus 101, but that at least the main circuit operates normally.

Figure 4:
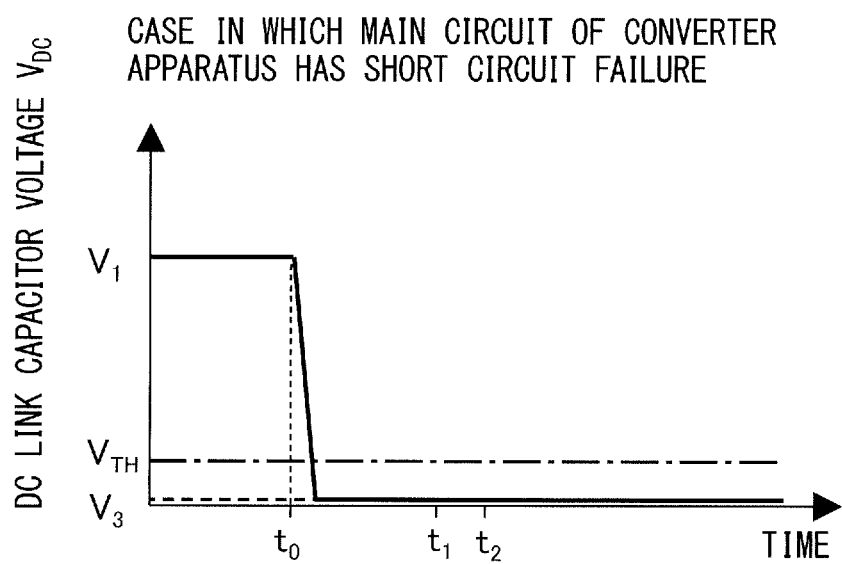
FIG. 4 is a graph showing a variation in the voltage of the DC link capacitor with time, when the main circuit of the converter circuit has a short circuit failure.

Next, an instance where the main circuit of the converter apparatus has a short circuit failure will be described. FIG. 4 is a graph showing a variation in the voltage of the DC link capacitor with time, when the main circuit of the converter apparatus has a short circuit failure. It is assumed that, until a time $t_0$, the motor drive device operates normally, and the voltage $V_{DC}$ of the DC link capacitor 2 is at $V_1$, as in the case of the normal state. When a short circuit failure occurs at the time to in the main circuit of the converter apparatus 101, both ends of the DC link capacitor 2 are connected at a low impedance. Electric charge of the DC link capacitor 2 is suddenly reduced, and thus the voltage $V_{DC}$ of the DC link capacitor 2 is suddenly reduced. As shown in FIG. 4, the voltage $V_{DC}$ is assumed to be reduced to $V_3$, after the occurrence of the short circuit failure. The voltage $V_3$ is almost 0 [V]. After that, at a time $t_1$, the switching operation unit 5 detects any abnormality in the motor drive device, and controls the switching unit 4 so as to turn the switching unit 4 into an open state, in order to disconnect the power supply 10 from the converter 1. The power supply 10 is disconnected from the converter 1. Assuming that the short circuit failure detection unit 8 receives the value of the voltage $V_{DC}$ at a time $t_2$, the voltage at this time is the same as the voltage $V_3$, which is less than the threshold value $V_{TH}$. Thus, the voltage $V_{DC}$ of the DC link capacitor 2 is determined to be less than the threshold value $V_{TH}$. In step S107, the short circuit failure detection unit 8 determines that the occurred abnormality is caused by a short circuit failure of the main circuit of the converter apparatus 101. As described above, according to the method for detecting a short circuit failure of this embodiment, the occurrence of a short circuit failure of the main circuit of the converter apparatus is determined by detecting that the capacitor voltage is suddenly reduced to the threshold value or less, immediately after the disconnection from the power supply.

The above description describes an instance where the DC link capacitor of the main circuit of the converter apparatus has a short circuit failure. However, if the converter or the snubber circuit has a short circuit failure, the short circuit failure can be detected in the same manner.

The converter apparatus and the method for detecting a short circuit failure of the converter apparatus according to the embodiment of this disclosure can detect the presence or absence of an abnormality in the main circuit of the converter apparatus, with the simple configuration.

What is claimed is:

1. A converter apparatus comprising:
   a converter configured to convert an AC voltage supplied from a power supply into a DC voltage, and output the DC voltage;
   a DC link capacitor connected to an output side of the converter;
   a voltage detection unit configured to detect a voltage of the DC link capacitor;
   a switching unit configured to connect and disconnect each input side between the power supply and the converter;
   a switching operation unit configured to monitor an abnormality in a motor drive device including the converter apparatus and an inverter connected to the converter apparatus, and issue a command to the switching unit;
   a power supply monitoring unit configured to detect a voltage inputted to the converter to monitor a connection state between the power supply and the converter;
   a threshold value setting unit configured to set a threshold value to determine the presence or absence of a short circuit failure; and
   a short circuit failure detection unit configured to determine that a short circuit failure has occurred based only on the voltage of the DC link capacitor, immediately after the switching unit disconnects the power supply from the converter, being equal to or less than the threshold value,
   wherein:
   the voltage detector unit is a voltage detector,
   the switching unit is a switch,
   the switching operation unit is a switching operation monitor,
   the power supply monitoring unit is a power supply monitor,
   the threshold value setting unit is a threshold value setter, and
   the short circuit failure detection unit is a short circuit failure detector.

2. The converter apparatus according to claim 1, wherein when the short circuit failure is detected, the short circuit failure detection unit issues a notification about the occurrence of an abnormality in a main circuit of the converter apparatus.

3. The converter apparatus according to claim 1, wherein the threshold value setting unit can rewrite the threshold value, based on a signal inputted from outside.

4. The converter apparatus of claim 2, wherein the short circuit failure detection unit is a short circuit failure detector.

5. The converter apparatus of claim 3, wherein the threshold value setting unit is a threshold value setter.

6. A method for detecting a short circuit failure of a converter apparatus including:
   a converter configured to convert an AC voltage supplied from a power supply into a DC voltage, and output the DC voltage;
   a DC link capacitor connected to an output side of the converter;
   a voltage detection unit configured to detect a voltage of the DC link capacitor;
   a switching unit configured to control a supply of the AC voltage from the power supply to the converter; and
   a switching operation unit configured to monitor an abnormality in a motor drive device including the converter apparatus and an inverter connected to the converter apparatus, and issue a command to the switching unit, the method comprising:
   detecting an abnormality, and controlling the switching unit so as to turn the switching unit into an open state to disconnect the power supply from the converter by the switching operation unit;

detecting a voltage of the DC link capacitor, immediately after the power supply is disconnected from the converter; and determining that a short circuit failure has occurred in a main circuit of the converter apparatus based only on the detected voltage of the DC link being equal to or less than a threshold value, wherein:

the voltage detector unit is a voltage detector, the switching unit is a switch, and the switching operation unit is a switching operation monitor.

7. The method for detecting a short circuit failure of the converter apparatus according to claim 6, further comprising issuing a notification about the occurrence of an abnormality, when a short circuit failure detection unit has detected a short circuit failure.

8. The method for detecting a short circuit failure of the converter apparatus according to claim 6, further comprising rewriting the threshold value based on a signal inputted from outside, by a threshold value setting unit.

9. The method of claim 7, wherein the short circuit failure detection unit is a short circuit failure detector.

10. The method of claim 8, wherein the threshold value setting unit is a threshold value setter.

* * * * *